(12) United States Patent
Forlivesi et al.

(10) Patent No.: US 9,509,576 B2
(45) Date of Patent: Nov. 29, 2016

(54) METHOD FOR TRANSFERRING STATE INFORMATION PERTAINING TO A PLURALITY OF SIP CONVERSATIONS

(75) Inventors: Claudio Forlivesi, Sint-Lambrechts-Woluwe (BE); Nico Janssens, Putte (BE); Alessandro Duminuco, Milan (IT)

(73) Assignee: Alcatel Lucent, Boulogne-Billancourt (FR)

( * ) Notice: Subject to any disclaimer, the term of this patent is extended or adjusted under 35 U.S.C. 154(b) by 290 days.

(21) Appl. No.: 14/233,551

(22) PCT Filed: Jul. 9, 2012

(86) PCT No.: PCT/EP2012/063390
§ 371 (c)(1),
(2), (4) Date: Apr. 24, 2014

(87) PCT Pub. No.: WO2013/010844
PCT Pub. Date: Jan. 24, 2013

(65) Prior Publication Data
US 2014/0310406 A1 Oct. 16, 2014

(30) Foreign Application Priority Data

Jul. 18, 2011 (EP) .................................... 11290326

(51) Int. Cl.
*G06F 15/173* (2006.01)
*H04L 12/26* (2006.01)
*H04L 29/06* (2006.01)
*H04L 29/08* (2006.01)

(52) U.S. Cl.
CPC .......... *H04L 43/04* (2013.01); *H04L 43/0876* (2013.01); *H04L 65/1006* (2013.01); *H04L 65/1083* (2013.01); *H04L 67/1029* (2013.01); *H04L 67/1031* (2013.01); *H04L 67/14* (2013.01); *H04L 67/142* (2013.01); *H04L 67/148* (2013.01)

(58) Field of Classification Search
USPC ................................ 709/224, 223, 238, 219
See application file for complete search history.

(56) References Cited

U.S. PATENT DOCUMENTS 5,951,694 A    9/1999   Choquier et al.
2005/0038848 A1   2/2005   Kaluskar et al.

FOREIGN PATENT DOCUMENTS

CN    101714949 A2   5/2010
CN    101815079 A2   8/2010
EP    1 895 412 A1   3/2008

OTHER PUBLICATIONS

3GPP: "3rd Generation Partnership Project; Technical Specification Group Services and System Aspects; Feasibility Study on IMS Evolution; (Release 9)," 3GPP TR 23.812 V1.1.5, XP050515595, pp. 1-59, May 2001.
International Search Report for PCT/EP2012/063390 dated Nov. 2, 2012.
3GPP: "3rd Generation Partnership Project; Technical Specification Group Services and System Aspects; Feasibility Study on IMS Evolution; (Release 9)," 3GPP TR 23.812 V1.1.5, XP050515595, pp. 1-59, May 2011.

*Primary Examiner* — Lan-Dai T Truong
(74) *Attorney, Agent, or Firm* — Fay Sharpe, LLP

(57) ABSTRACT

A method for transferring state information pertaining to a plurality of SIP conversations from a first SIP server to a second SIP server, said first SIP server and said second SIP server being operatively connected to one or more SIP gateways, the method comprising at a controlling node: monitoring said first SIP server until ongoing transactions are terminated; after termination of said ongoing transactions, obtaining dialog state information pertaining to conversations managed by said first SIP server from said first SIP server; and storing said obtained dialog state information at said second SIP server.

15 Claims, 6 Drawing Sheets

METHOD FOR TRANSFERRING STATE INFORMATION PERTAINING TO A PLURALITY OF SIP CONVERSATIONS

FIELD OF THE INVENTION

The present invention pertains to the field of networks adapted to support Session Initiation Protocol (SIP) sessions.

BACKGROUND

Virtualization technologies enable computing systems to handle surges of load by provisioning additional virtual machines on an as-needed basis. Hence, instead of over-dimensioning a computing system to handle (potential) peak loads, cloud computing enables these computing systems to acquire and release resources according to their present needs. Scalable systems of this type will hereinafter be referred to as "elastic" systems.

The Session Initiation Protocol (SIP), used for setting up and controlling multimedia communication sessions between end points over a packet-based network such as the Internet, is a stateful protocol. This means that the participants in a protocol exchange have to remember the state of the exchange to adequately respond to protocol incidents. Moreover, the majority of SIP servers are stateful—for instance because they maintain "dialogs" representing the SIP relationship between two SIP User Agents (UAs), which persist for some time. In addition, SIP can run over a variety of transport protocols, including the Transport Control Protocol (TCP), which is itself a state-sensitive protocol.

SUMMARY

A method to decouple SIP servers from their (non-elastic) counterparts, as well as from SIP UAs, so as to enable dynamically scaling out and clustering of SIP servers, in particular call stateful SIP servers, without compromising ongoing calls, is provided in a patent application entitled "Method and apparatus for interconnecting a user agent to a cluster of servers" in the name of the applicant, filed on the same day as the present application, the content of which is hereby incorporated by reference. The application introduces the concept of a Client Elasticity Gateway (CEG) and a Server Elasticity Gateway (SEG).

In a network providing SIP elasticity, virtual SIP servers may be added or removed dynamically to cope with load changes. Situations may occur in which a single ongoing session or a small number of ongoing sessions delays the removal of an otherwise unwanted virtual server, which may lead to considerable allocation inefficiencies. Hence, there is a need for a method to reliably transfer ongoing SIP sessions from one elastic SIP server to another one, especially in the case of call stateful SIP servers.

According to an aspect of the present invention, there is provided a method for transferring state information pertaining to a plurality of SIP conversations from a first SIP server to a second SIP server, said first SIP server and said second SIP server being operatively connected to one or more SIP gateways, the method comprising at a controlling node monitoring said first SIP server until ongoing transactions are terminated; after termination of said ongoing transactions, obtaining dialog state information pertaining to conversations managed by said first SIP server from said first SIP server; and storing said obtained dialog state information at said second SIP server.

In an embodiment, the method according to the present invention further comprises suppressing the creation of new sessions at said first SIP server.

In a particular embodiment, the method according to the present invention further comprises identifying existing sessions of said first SIP server; initiating interception by said one or more SIP gateways of messages pertaining to new transactions inside identified existing sessions, said interception taking place during said monitoring; and releasing said intercepted messages to said second SIP server after said storing.

In a more particular embodiment, said suppressing comprises instructing said one or more SIP gateways to redirect messages pertaining to new sessions to said second SIP server.

In another more particular embodiment, said suppressing comprises instructing said one or more SIP gateways to take said second SIP server into use. More particularly, said instructing may take place by means of one of a Domain Name System update and a PUBLISH-SUBSCRIBE event.

In another particular embodiment, said suppressing comprises instructing said first SIP server to send a backpressure signal to said one or more SIP gateways prior to said monitoring; wherein, during said monitoring, said first SIP server receives messages in transit from said one or more SIP gateways and returns said received messages to the respective SIP gateways.

In more particular embodiment, said suppressing comprises instructing said one or more SIP gateways to take said second SIP server into use. More particularly, said instructing may take place by means of one of a Domain Name System update and a PUBLISH-SUBSCRIBE event.

In an embodiment, the method according to the present invention comprises sending a first signal and a second signal to said first SIP server, at least one of said first signal and said second signal comprising an identification of said second SIP server; wherein said first SIP server stores messages received from said one or more SIP gateways after receiving said first signal; and wherein, after receiving said second signal, said first SIP server forwards said stored messages to said second SIP server.

In a particular embodiment, the method further comprises instructing said one or more SIP gateways to take said second SIP server into use. Said instructing may take place by means of one of a Domain Name System update and a PUBLISH-SUBSCRIBE event.

According to an aspect of the present invention, there is provided a controlling node for use in the method as described above.

According to another aspect of the present invention, there is provided a SIP server for use in the method as described above.

According to another aspect of the present invention, there is provided a computer program configured to cause a programmable device to perform the method as described above.

BRIEF DESCRIPTION OF THE FIGURES

Some embodiments of apparatus and/or methods in accordance with embodiments of the present invention are now described, by way of example only, and with reference to the accompanying drawings, in which.

DETAILED DESCRIPTION OF EMBODIMENTS

The present invention is based inter alia on the insight that sessions can be more efficiently allocated among a cluster of (virtual) elastic SIP servers, if there is a possibility to move ongoing sessions from one server to another.

Figure 1:
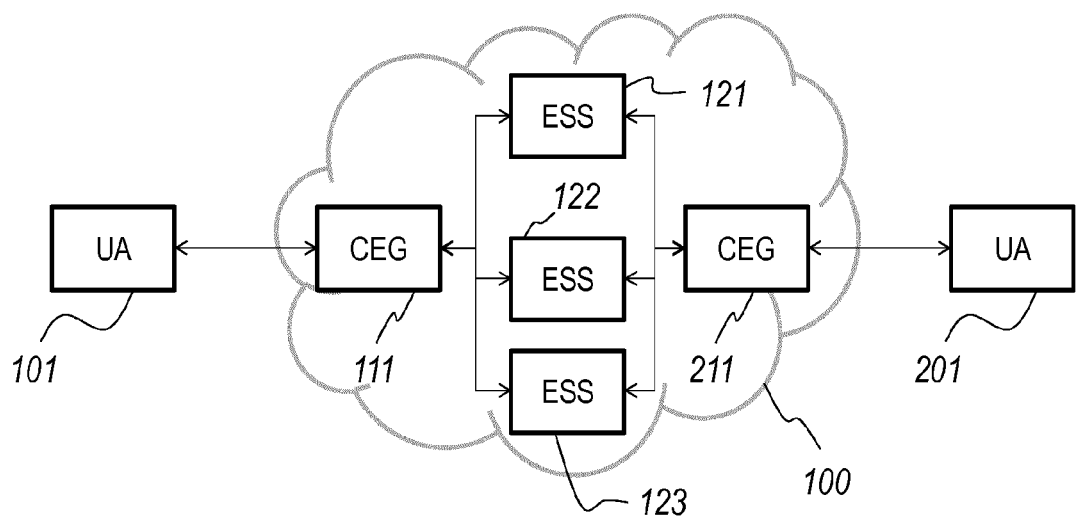
FIG. 1 illustrates an exemplary network comprising a single SIP domain.

FIG. 1 illustrates an exemplary network comprising two exemplary user agents 101, 201 interconnected by a single SIP domain 100. The SIP domain 100 comprises a first Client Elasticity Gateway (CEG) 111 and a second CEG 211, shielding a server cluster. Without loss of generality, the cluster is illustrated as containing three elastic SIP servers 121-123.

Without loss of generality, we consider the interaction between the first SIP CEG 111 and the topologically adjacent UA 101. SIP CEG 111 plays the role of User Agent Server (UAS) in all its communication with the UA 101, and the role of User Agent Client (UAC) in its relation with the SIP servers 121-123 of the elastic SIP cluster. The SIP CEG 111 thus conceals the elastic SIP servers 121-123 from the client 101 by acting as a single SIP server. It may include load balancing support and/or failover support by interacting with an Elasticity Control System (ECS) in accordance with the principles of the present invention. Furthermore, the SIP CEG 111 terminates elasticity control messages originating from the elastic SIP cluster 121-123, so it conceals the dynamics of the elastic SIP cluster from the UA 101—including instructions to redirect messages to another SIP server.

Traditional load balancers only process incoming messages. Since the SIP CEG 111 seeks to control all access to the elastic SIP cluster 121-123, it also forwards outgoing messages to the UA 101. Hence, the UA 101 sends responses back to the SIP CEG 111 instead of the actual SIP server that previously processed this message. This enables the CEG 111 to transparently redirect messages when new SIP servers are acquired, or when redundant SIP servers are released.

The interaction between the second SIP CEG 211 and the topologically adjacent UA 201 is fully analogous.

It is advantageous to deploy CEG instances close to the SIP UA—on a Femtocell, on a Home Gateway, or in the most extreme case even as a separate service on the SIP UA itself. By deploying (multiple) CEGB close to the client (instead of only a few CEGB close to the elastic SIP servers), the CEGs have to meet less strict scalability and high-availability requirements. Since only a few UAs depend on their functionality, the impact of a failure is limited.

A CEG deployed close to the elastic SIP servers, in contrast, would accommodate a greater number of UAs, and would therefore have to meet more stringent scalability and high-availability requirements.

The present invention is also based on the insight that a dedicated SIP Server Elasticity Gateway (SIP SEG) can be used to decouple SIP servers from peers that are non-elastic or that belong to a different domain.

Figure 2A:
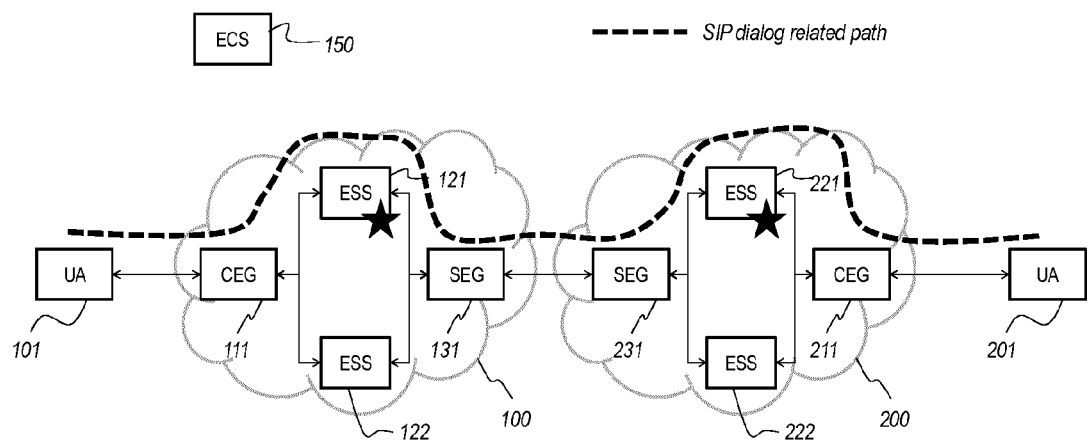
FIGS. 2a-2c illustrate an exemplary network comprising two SIP domains, at different stages of execution of a method according to the present invention.
Figure 2B:
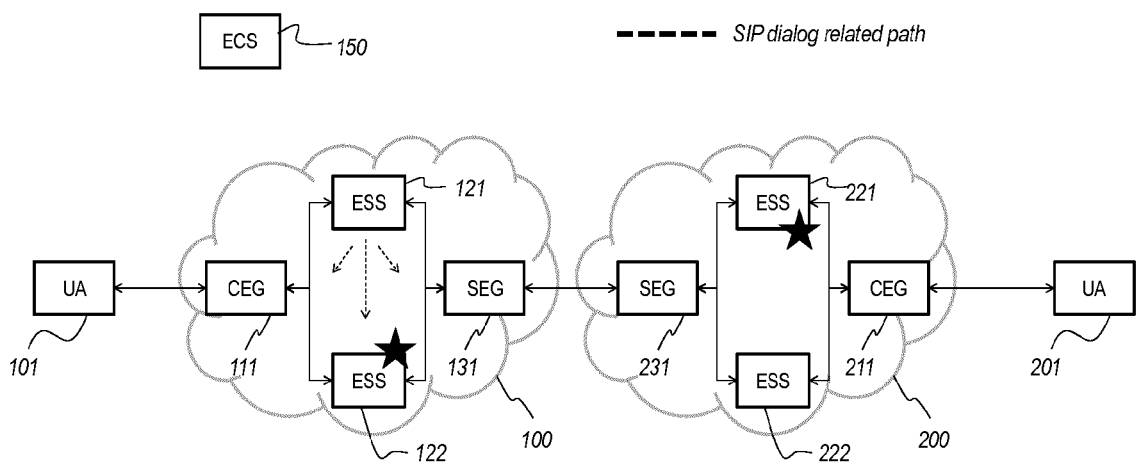
Figure 2C:
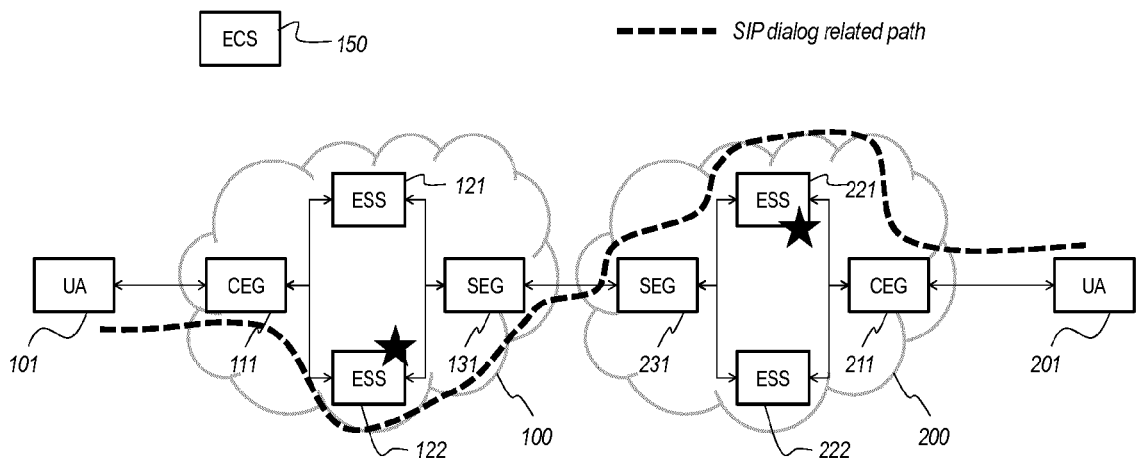

FIGS. 2a-c illustrate an exemplary network comprising two exemplary user agents 101, 201 interconnected by several SIP domains. Without loss of generality, two interconnected SIP domains 100, 200 are shown. Each of the illustrated SIP domains 100, 200 comprises a CEG 111, 211 facing the user agent, and a SEG 131, 231 facing the domain boundary. The CEG and the SEG of each domain 100, 200 shields a server cluster. Without loss of generality, each cluster is illustrated as containing three elastic SIP servers 121-123, 221-223.

The role of the SEG 131, 132 is similar to the CEG 111, 211; it redirects incoming messages to the appropriate server, it terminates elasticity control messages originating from the elastic SIP servers 121-123, 221-223, and it forwards messages to the next hop (to conceal the elastic SIP server that actually processed this message, and to make sure responses are sent back to the SEG).

Although the objectives of the CEG and the SEG are similar, their implementation and deployment model is slightly different. This has been the main reason to distinguish between the CEG (which decouples elastic SIP servers from SIP UAs) and the SEG (which decouples elastic SIP servers from peers that are non-elastic, or that belong to a different domain).

One of the main issues to scale out SIP clusters dynamically results from the fact that the SIP protocol is essentially stateful—that is, it defines a strict order in which messages are to be exchanged in the course of a SIP session. To facilitate the management of ongoing SIP sessions, the affected (call stateful) SIP servers typically represent the current state of these sessions using SIP dialogs. Consequently, all communication between two or more SIP UAs in the course of a SIP session has to be processed by the same SIP server, accommodating the affected SIP dialog.

This complicates the development and deployment of elastic SIP farms. When an Elastic Control System (ECS, responsible for monitoring the load of the elastic SIP farm, as well as for creating and removing nodes in response to these measurements) decides to reduce the number of SIP servers in an elastic SIP farm, for instance, it cannot delete servers that are processing ongoing sessions represented by SIP dialogs. When the ECS decides to increase the number of servers in an elastic SIP farm, new servers brought in do not take over part of the load of the other servers, but instead are taken into use gradually when new calls are being established.

To cope with instant load changes in an optimal manner, systems according to the present invention are able to transfer SIP dialogs between the servers of an elastic SIP farm, for instance in the face of server creation/deletion. When the ECS decides to remove a (virtual) SIP server form the elastic SIP farm, it transfers the server's dialogs towards the remaining SIP servers. When adding a new (virtual) SIP server to the elastic SIP farm, the ECS can immediately rebalance the load of a SIP farm by migrating dialogs of other SIP servers towards this newly added SIP server. Simultaneously to these dialog migrations, the ECS instructs the elastic SIP farm to redirect the messages that belong to the dialog's session to the new server.

An exemplary SIP session is illustrated in FIGS. 2a and 2c by means of a bold dashed line between a first user agent 101 and a second user agent 201. The conversation related data path passes via CEG 111, ESS 121, SEG 131, all belonging to a first domain 100 and further through SEG 231, ESS 221 and SEG 211, all belonging to a second domain 200. SIP servers ESS 121 and 221 are marked in FIG. 2a with a black star, indicating that the state information pertaining to the SIP dialogue under consideration is stored in these servers. For completeness, an Elastic Control System 150 is shown near the SIP network of FIGS. 2a-2c to indicate the presence of a system that controls the handover in the network under consideration. However, although this entity is shown as a different element, the skilled person will understand that the ECS 150 may in fact be implemented either as a stand-alone network node or as a part of any of the other network elements already illustrated in the Figure. In particular, the ECS 150 may be part of the ESS 121, 122 or of either of the CEG 111 and SEG 131.

Turning now to the effects of methods according to the present invention, it shall be assumed that at some point in time, the ECS 150 decides that the represented dialogue must be migrated from the active ESS 121 to a different server. For illustration purposes ESS 122 is assumed to be the destination server. The decision of the ECS 150 to migrate the conversation from ESS 121 to ECS 122 may be inspired by load balancing considerations, by a failure of original server 121, by a desire to take ESS 121 out of service, for instance because of a very low load, or by a desire to attract more traffic in ESS 122, for instance because it was recently created as a virtual server on an appropriate hosting platform. As a result of the decision by ECS 150 to move the ongoing conversation from ESS 121 to ESS 122, state information will have to be transferred from ESS 121 to ESS 122 in accordance with the methods that will be described in more detail below.

FIG. 2b schematically illustrates how ESS 121 will communicate with the target ESS 122 and optionally, dependent on the chosen method, with CEG 111 and SEG 131 in order to execute the handover. To ensure that this can happen without loss or corruption of information it is necessary to avoid any transitory states in which both ESS 121 and ESS 122 are believed to be responsible for the same session. Embodiments of the present invention are based on the insight of the inventors, that it is advantageous to temporarily suppress the occurrence of new transactions within the sessions originally managed by server 121 and to allow ongoing transactions to be completed prior to moving the state information relevant to the session from ESS 121 to ESS 122.

FIG. 2b schematically illustrates the absence of new transactions by the absence of the bold dashed line representing the dialogue path and further indicates that the state information represented by the black star is now hosted by the target server ESS 122. Once the state information has been moved and the neighboring nodes CEG 111 and SEG 131 have been properly informed of the move of this session, the end situation illustrated in FIG. 2c has been achieved and the conversation can resume along the path illustrated in that figure.

Figure 3:
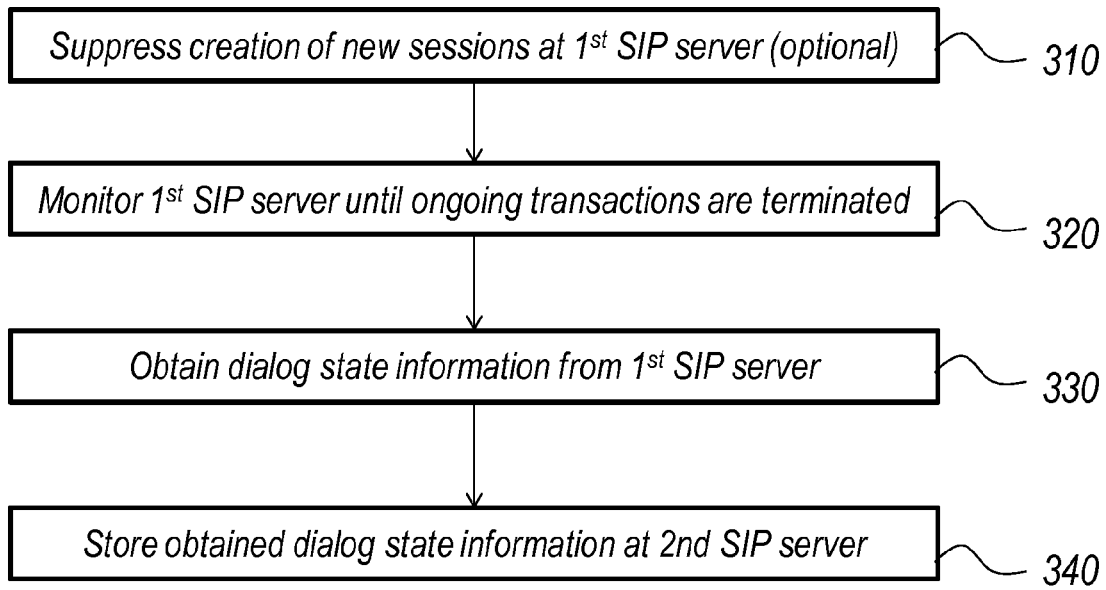
FIG. 3 presents a flow chart of a method according to an embodiment of the present invention.

At general level, embodiments of the method according to the present invention are illustrated by the flowchart of FIG. 3, where in a first step 310 the creation of new session at the first SIP server 121 is suppressed as the result of the Elastic Control System 150 (this suppression step, when present, may take the form of backpressure from the elastic SIP server or a redirection implemented at the CEG or SEG). In a second step 320 the ECS 150 starts monitoring the activity at the first SIP server 121 until all ongoing transactions are terminated. In a third step 330, the ECS 150 reads the dialogue state information from the first SIP server and finally in a fourth step 340, the ECS 150 stores the obtained dialogue state information at the second SIP server 121. At this point, this state information has safely been transferred from the first ESS 121 to the second ESS 122 and normal transactions can resume in the transferred sessions.

An exemplary scenario is now described with reference to FIG. 4.

The ECS 150 first instructs all CEGB 111 and SEGS 131 to redirect messages that would start a new session (create a new dialog) on the affected server 121 (e.g. INVITE message) towards another server 122. Next, the ECS 150 acquires the dialog specs (as well as other state information) of the ongoing sessions the affected server 121 is currently processing. For every dialog (which represents an ongoing call), the ECS 150 instructs the affected CEGs 111 and SEGs 131 to intercept messages that start new transactions as part of the ongoing sessions on the server hosting the dialog (e.g. BYE message)—all other messages are transferred to the affected server 121 such that the ongoing transactions can complete. Next, the ECS 150 monitors the affected server until every ongoing transaction is finished. Note that a (SIP) session may include multiple transactions (e.g. INVITE and BYE transaction), and hence completing an ongoing transaction does not imply the associated session is finished as well. Once every ongoing transaction is finished (which will occur in bounded time, in contrast to waiting until the associated session is finished), the ECS 150 transfers the remaining dialogs (as well as all other session states) from the server 121 being removed to one or more remaining SIP servers 122. Once this is accomplished, the ECS 150 instructs the CEGs 111 and SEGs 131 to release all intercepted messages, and to redirect them to these new servers 122. The ECS 150 can now safely remove the old SIP server 121.

Another exemplary scenario is now described with reference to FIG. 5.

The ECS 150 instructs the SIP server 121 being removed to deactivate. In response to this request, the affected SIP server 121 sends backpressure when receiving messages that start a new session (dialog). This can be a SIP 503 Service Unavailable response, or a dedicated backpressure message that encapsulates the original request. On the receipt of such a backpressure message, the CEG 111 or SEG 131 redirect the original request to another SIP server 122 in the elastic cluster, and excludes the SIP server 121 sending the backpressure from the list of available servers.

After instructing the SIP server 121 to deactivate, the ECS 150 monitors this server until every ongoing transaction is complete (e.g. using PUBLISH SUBSCRIBE mechanisms). Next, the ECS 150 transfers the remaining dialogs (as well as all other session states) from the server 121 being removed to one or more remaining SIP servers 122. If in the course of this state transfer the old server 121 receives another message (such as a BYE message), it sends back this message to the originating CEG 111 or SEG 131 which holds this message until the state migration is complete. Once this is done, the ECS 150 instructs the affected CEGs 111 and SEGs 131 to release intercepted messages and to redirect them to the new servers 122.

Another exemplary scenario is now described with reference to FIG. 6.

The ECS 150 instructs the affected SIP server 121 to start a dialog handover, and monitors this server 121 until every ongoing transaction is completed. Once this state is reached, the SIP server 121 intercepts all remaining messages. After the ECS 150 has transferred the session state data to the new SIP servers 122, the ECS 150 instructs the old SIP server 121 to forward all intercepted messages as well as newly arriving messages. The ECS 150 then instructs the CEGs 111 and SEGs 131 to redirect messages to the new servers 122, and removes the old server 121.

Note that the ECS 150 does not necessarily have to be deployed as a separate server. Its functionality can be deployed as well on the affected SIP servers 121, 122, or be integrated as part of this server's functionality.

Figure 4:
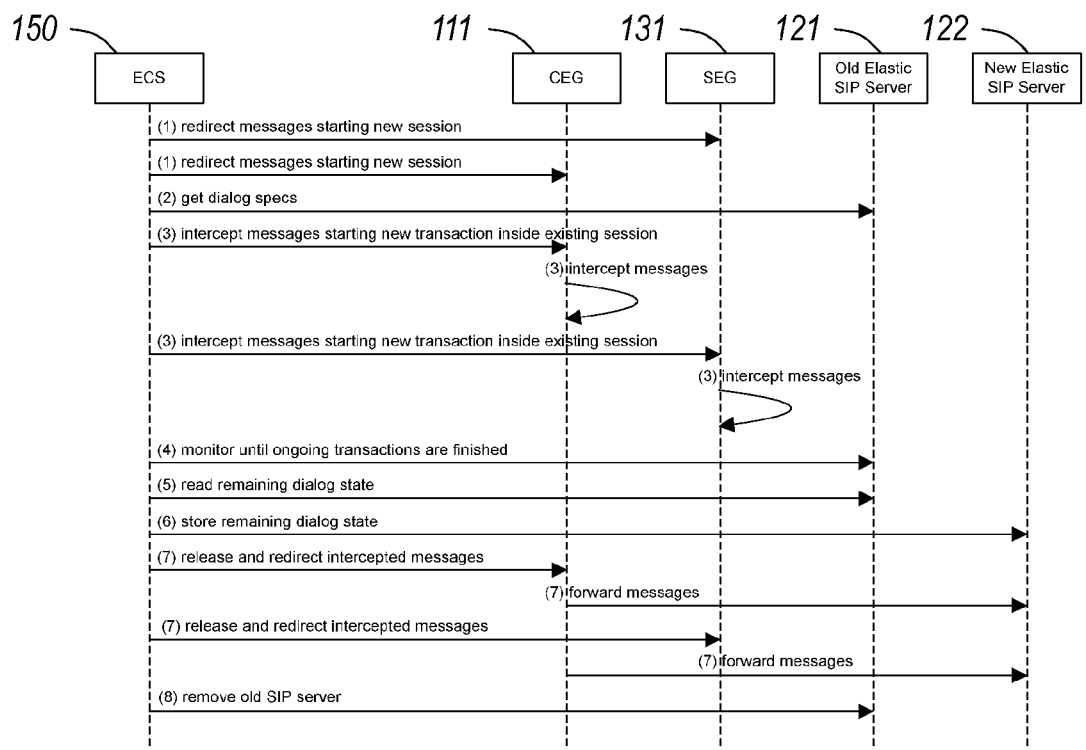
FIGS. 4-6 present protocol exchanges of methods according to various embodiments of the present invention, in particular in the context of the removal of an elastic SIP server from the cluster.
Figure 7:
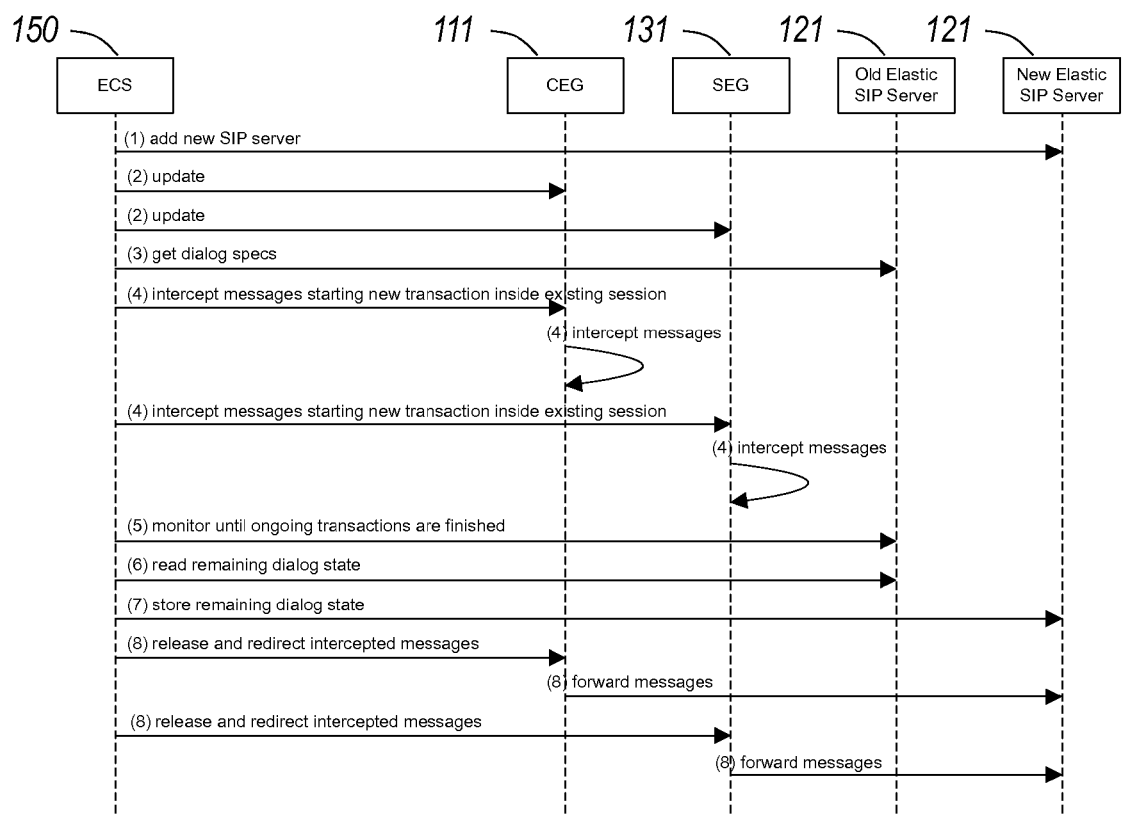
FIGS. 7-9 present protocol exchanges of methods according to various embodiments of the present invention, in particular in the context of the addition of an elastic SIP server to the cluster.

A variant of the scenario illustrated in FIG. 4 is now described with reference to FIG. 7.

After creating a new (virtual) SIP server 122, the ECS 150 updates all CEGs 111 and SEGs 131 to take this server 122 into use (this can be accomplished in an indirect manner through the Domain Name System DNS, or in a direct manner using techniques like PUBLISH-SUBSCRIBE). Next, the ECS 150 acquires the specs of the dialogs (sessions) that will be migrated to this new SIP server 122. The ECS 150 acquires the specifications of the dialogs to be migrated. For every dialog (which represents an ongoing session), the ECS 150 instructs the affected CEGs 111 and SEGs 131 to intercept messages that start new transactions (as part of these ongoing sessions) on the servers 121 hosting the dialogs (e.g. BYE messages). After the ECS 150 determines that all ongoing transactions have finished, it transfers the affected dialogs to the new SIP server 122. Finally, the ECS 150 instructs the CEGs 111 and SEGs 131 to release all intercepted messages, and to redirect them to the destination server 122.

Figure 5:
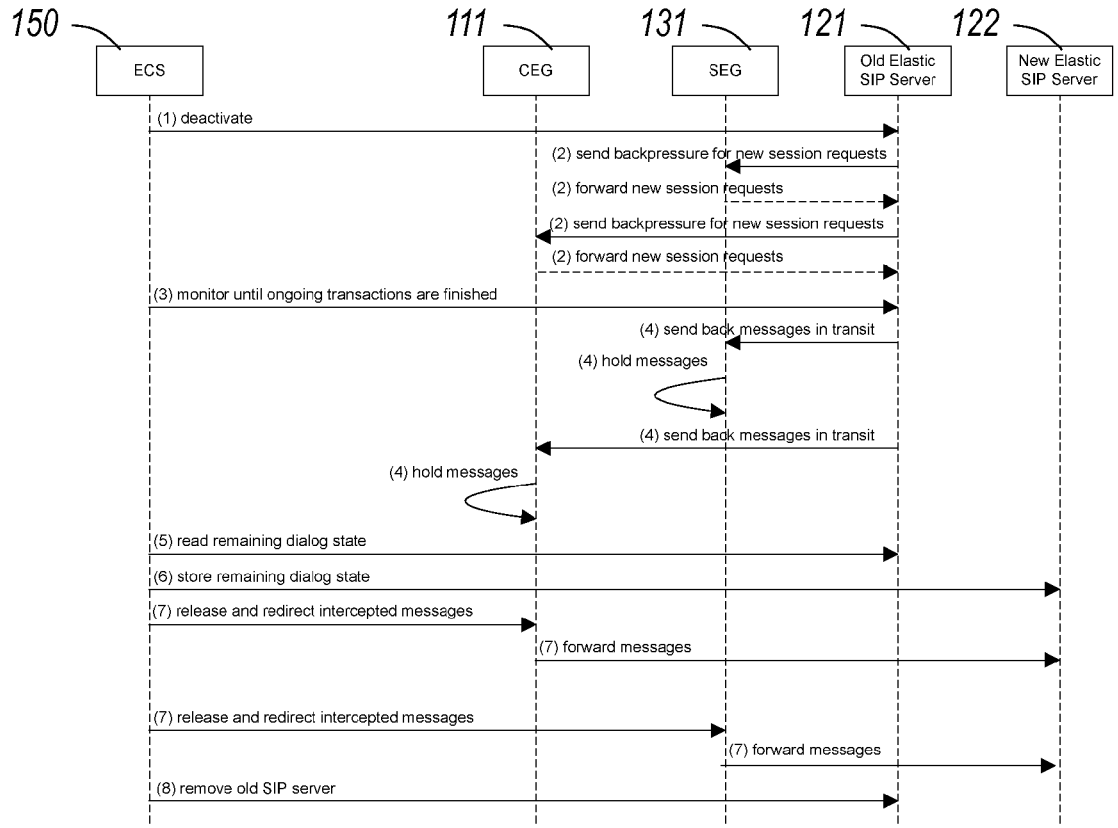
Figure 8:
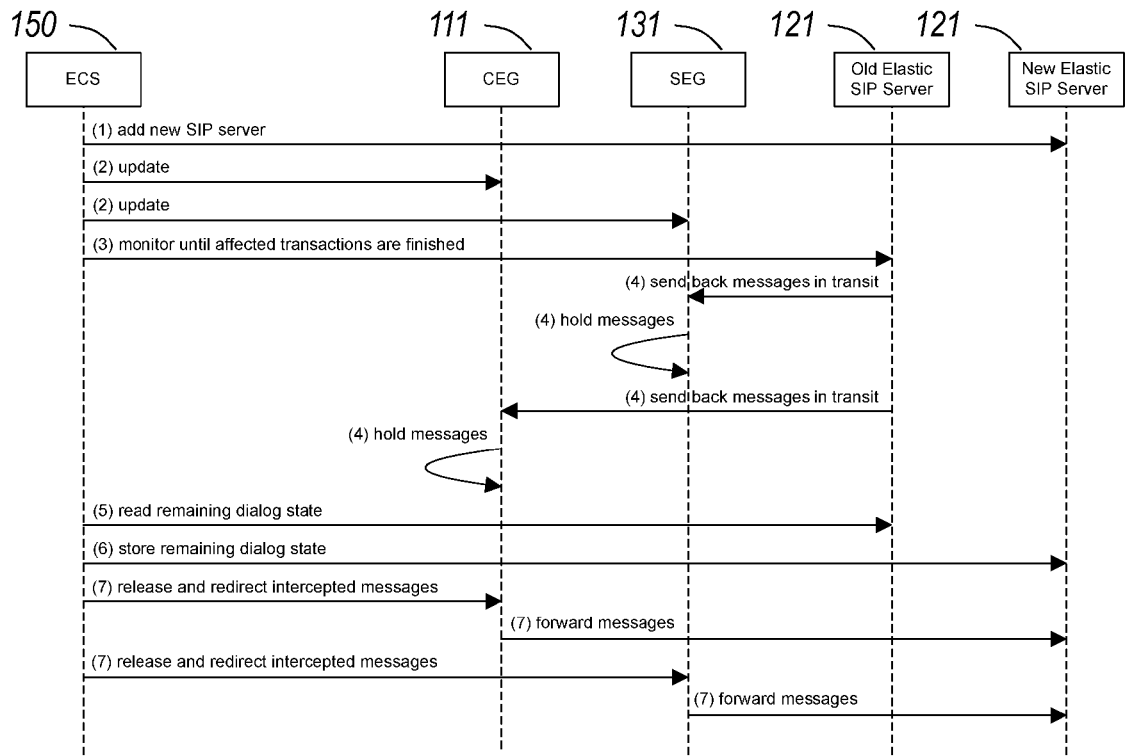

A variant of the scenario illustrated in FIG. 5 is now described with reference to FIG. 8.

After creating a new (virtual) SIP server 122, the ECS 150 updates all CEGs 111 and SEGs 131 to take this server 122 into use. Next, the ECS 150 monitors all nodes 121 (that are processing sessions being transferred to this new SIP server 122) until every ongoing transaction is finished, and transfers the remaining dialogs (as well as all other session states) to the new SIP server 122. If messages arrive at the old servers 121 in the course of this state transfer, these servers send back these message to the originating CEG 111 or SEG 131 (which holds them until the state migration is complete). Once this is done, the ECS 150 instructs the affected CEGs 111 and SEGs 131 to release intercepted messages and to redirect them to the new server 122.

Figure 6:
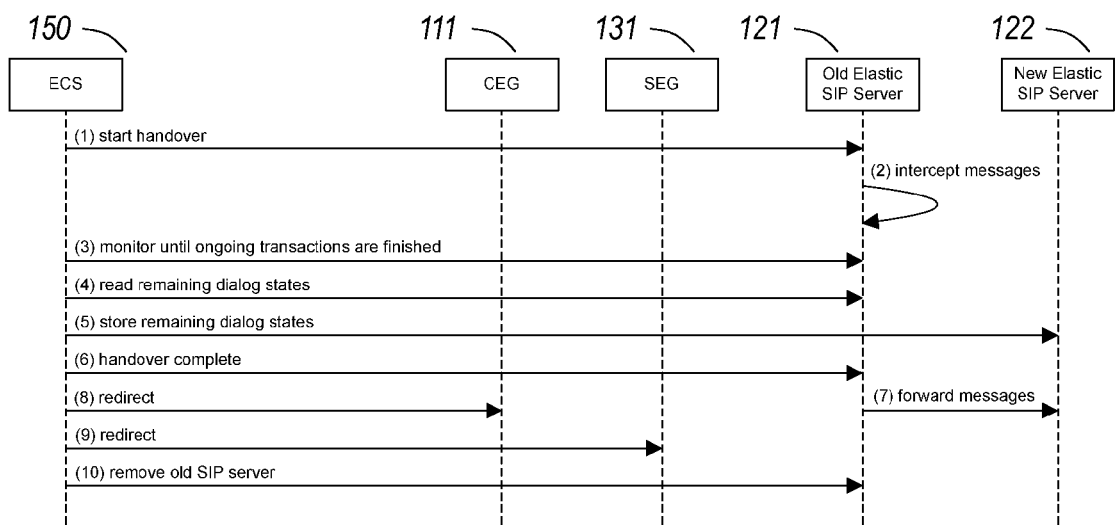
Figure 9:
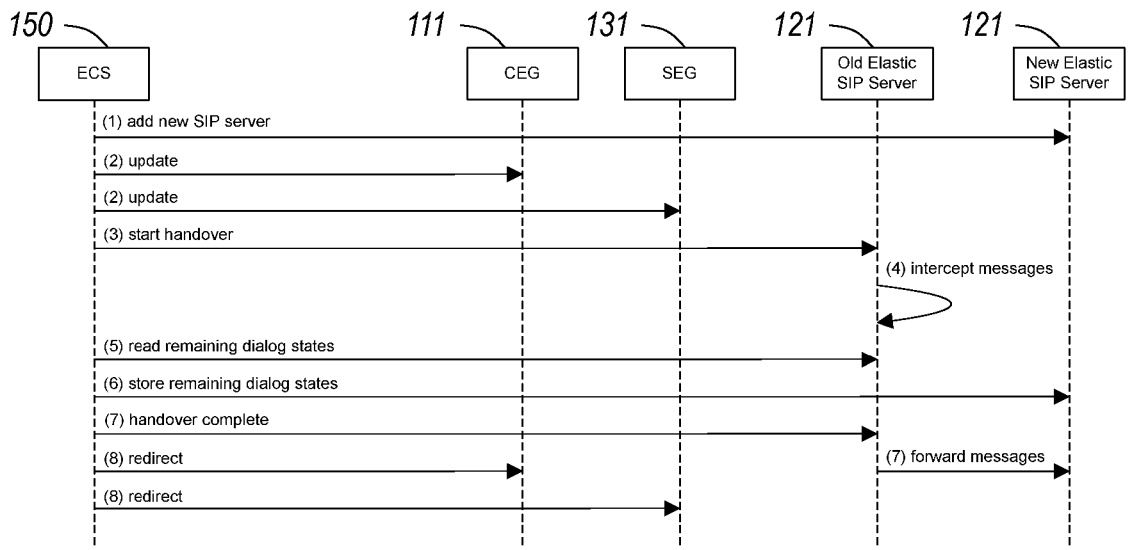

A variant of the scenario illustrated in FIG. 6 is now described with reference to FIG. 9.

After creating a new (virtual) SIP server 122, the ECS 150 updates all CEGs 111 and SEGs 131 to take this server 122 into use. Next, the ECS 150 instructs the affected SIP servers 121 (that are processing sessions being transferred to this new SIP server 122) to start a dialog handover, and monitors these servers 121 until every ongoing transaction is completed. Once this state is reached, the SIP servers 121 intercept all remaining messages. After the ECS 150 has transferred the session state data to the new SIP server 122, the ECS 150 instructs the old SIP servers 121 to forward all intercepted messages as well as newly arriving messages. Finally, the ECS 150 then instructs the CEGs 111 and SEGs 131 to redirect messages to the new server.

Note that (similar to the removal scenarios) the ECS 150 does not necessarily have to be deployed as a separate server. Its functionality can be deployed as well on the affected SIP servers 121, 122, or be integrated as part of this server's functionality.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

The invention claimed is:

1. A method for transferring state information pertaining to a plurality of SIP conversations from a first SIP server to a second SIP server, said first SIP server and said second SIP server being operatively connected to one or more SIP gateways, the method comprising at a controlling node:
   monitoring said first SIP server until ongoing transactions are terminated;
   after termination of said ongoing transactions, obtaining dialog state information pertaining to conversations managed by said first SIP server from said first SIP server; and
   sending said obtained dialog state information to be stored at said second SIP server.

2. The method according to claim 1, further comprising suppressing the creation of new sessions at said first SIP server.

3. The method according to claim 2, further comprising:
   identifying existing sessions of said first SIP server;
   initiating interception by said one or more SIP gateways of messages pertaining to new transactions inside identified existing sessions, said interception taking place during said monitoring; and
   releasing said intercepted messages to said second SIP server after said storing.

4. The method according to claim 3, wherein said suppressing comprises instructing said one or more SIP gateways to redirect messages pertaining to new sessions to said second SIP server.

5. The method according to claim 3, wherein said suppressing comprises instructing said one or more SIP gateways to take said second SIP server into use.

6. The method according to claim 5, wherein said instructing takes place by means of one of a Domain Name System update and a PUBLISH-SUBSCRIBE event.

7. The method according to claim 2, wherein said suppressing comprises instructing said first SIP server to send a backpressure signal to said one or more SIP gateways prior to said monitoring; wherein, during said monitoring, said first SIP server receives messages in transit from said one or more SIP gateways and returns said received messages to the respective SIP gateways.

8. The method according to claim 7, wherein said suppressing comprises instructing said one or more SIP gateways to take said second SIP server into use.

9. The method according to claim 8, wherein said instructing takes place by means of one of a Domain Name System update and a PUBLISH-SUBSCRIBE event.

10. The method according to claim 1, further comprising sending a first signal and a second signal to said first SIP server, at least one of said first signal and said second signal comprising an identification of said second SIP server; wherein said first SIP server stores messages received from said one or more SIP gateways after receiving said first signal; and wherein, after receiving said second signal, said first SIP server forwards said stored messages to said second SIP server.

11. The method according to claim 10, further comprising instructing said one or more SIP gateways to take said second SIP server into use.

12. The method according to claim 11, wherein said instructing takes place by means of one of a Domain Name System update and a PUBLISH-SUBSCRIBE event.

13. A controlling node, comprising:
at least one processor configured to:
monitor a first SIP server until ongoing transactions are terminated;
after termination of said ongoing transactions, obtain dialog state information pertaining to conversations managed by said first SIP server from said first SIP server; and
sending said obtained dialog state information to be stored at a second SIP server.

14. A first SIP server, comprising:
at least one processor configured to:
allow monitoring by a controlling node until ongoing transactions are terminated; and
after termination of said ongoing transactions, provide dialog state information pertaining to conversations managed by said first SIP server to the controlling node that is configured to send the obtained dialog state information to a second SIP server.

15. A non-transitory computer readable medium including computer readable instructions, which when executed by a processor, cause the processor to:
monitor a first SIP server until ongoing transactions are terminated;
after termination of said ongoing transactions, obtain dialog state information pertaining to conversations managed by said first SIP server from said first SIP server; and
store said obtained dialog state information at a second SIP server.

* * * * *